US012780448B2

(12) United States Patent
Zhou et al.

(10) Patent No.: US 12,780,448 B2
(45) Date of Patent: Nov. 3, 2026

(54) SERVO LOAD PLATFORM SUITABLE FOR TWO-DF COUPLED MOTION

(71) Applicant: Sichuan Institute of Aerospace Electronic Equipment, Chengdu (CN)

(72) Inventors: Tao Zhou, Chengdu (CN); Xiang Yao, Chengdu (CN); Junjiang Zhao, Chengdu (CN); Minhua Guo, Chengdu (CN); Xin Zhang, Chengdu (CN); Jin Zhao, Chengdu (CN); Juntong Chen, Chengdu (CN); Peng Tang, Chengdu (CN); Xin Rui, Chengdu (CN); Wusheng Wang, Chengdu (CN); Xu Zhang, Chengdu (CN); Lingyun Chen, Chengdu (CN); Liwen He, Chengdu (CN); Yilong Zhang, Chengdu (CN)

(73) Assignee: Sichuan Institute of Aerospace Electronic Equipment, Chengdu (CN)

( * ) Notice: Subject to any disclaimer, the term of this patent is extended or adjusted under 35 U.S.C. 154(b) by 186 days.

(21) Appl. No.: 19/002,939

(22) Filed: Dec. 27, 2024

(65) Prior Publication Data

US 2026/0166715 A1 Jun. 18, 2026

(30) Foreign Application Priority Data

Dec. 13, 2024 (CN) ........................ 202411839478.3

(51) Int. Cl.
*B64F 5/60* (2017.01)
*G01M 5/00* (2006.01)

(52) U.S. Cl.
CPC ............... *B64F 5/60* (2017.01); *G01M 5/005* (2013.01); *G01M 5/0016* (2013.01)

(58) Field of Classification Search
CPC ........ B64F 5/60; G01M 5/005; G01M 5/0016
See application file for complete search history.

(56) References Cited

U.S. PATENT DOCUMENTS

| | | | | |
|---|---|---|---|---|
| 5,067,353 A * | 11/1991 | Sersen | G01M 5/005 73/849 |
| 2020/0255121 A1* | 8/2020 | Rosemeier | B64C 11/04 |
| 2023/0014817 A1* | 1/2023 | Lee | G01M 5/005 |

FOREIGN PATENT DOCUMENTS

| | | |
|---|---|---|
| CN | 103076195 A | 5/2013 |
| CN | 206841691 U | 1/2018 |
| CN | 114977632 A | 8/2022 |

* cited by examiner

*Primary Examiner* — Minnah L Seoh
*Assistant Examiner* — Gregory T Prather
(74) *Attorney, Agent, or Firm* — Nitin Kaushik

(57) ABSTRACT

The present invention discloses a servo load platform suitable for two-DF (degree of freedom) coupled motion, which is involved in the field of servo testing technology, solving the problem of the prior art being hard to load servos with two-DF coupled motion. It comprises a base for fixing a servo mounting seat, guide rods vertically set on the base, a slider for sliding on the guide rods, a spherical-hinge seat installed on the slider, an elastic loading rod connected to the movable end of the spherical-hinge seat, a connecting seat connected to the lower end of the elastic loading rod, and a control surface fixture that is set on the upper end of the servo mounting seat and detachably connected to the connecting seat.

10 Claims, 8 Drawing Sheets

SERVO LOAD PLATFORM SUITABLE FOR TWO-DF COUPLED MOTION

CROSS-REFERENCE TO RELATED APPLICATIONS

The application claims priority to Chinese patent application No. 2024118394783, filed on Dec. 13, 2024, the entire contents of which are incorporated herein by reference.

TECHNICAL FIELD

The present invention relates to the field of servo testing technology, particularly to a servo load platform suitable for two-DF coupled motion.

BACKGROUND

As the actuator of an aircraft, a servo plays a role in maintaining the aircraft's smooth or maneuverable flight. Servos usually have three forms: electric, pneumatic and hydraulic forms. For small conventional aircraft, electric servos are the most widely used. Most electric servos use brush or brushless motors as driving components, ball screws, multi-stage gear transmissions, harmonic gears or planetary gears as transmission components, and are directly connected to control surface output shafts for motion transmission. For actual flight, a control surface is subjected to aerodynamic loads and acts on a transmission mechanism and the corresponding servo needs to overcome the load and be able to drive the control surface to deflect normally. In order to verify whether a servo can maintain good driving performance under complex aerial environments, it is necessary to use a load platform to simulate torque loading on the servo during development, and test its dynamic performance and control accuracy under loading conditions.

At present, domestic research institutions have conducted a lot of research on aircraft servo load platforms, however, most of the developed servo load platforms aim to conduct single-channel testing of servos, and relatively little research on servo load platforms with multi-channel coupled motion have been presented. A traditional servo load platforms applies rotational torque through a square spring torsion bar, which is directly connected to the end of an output shaft through a fixture. The rotation of the output shaft drives the spring torsion bar, achieving linear loading on the servo shaft. The traditional loading method has the advantages of independent loading for each channel, easy mechanical examination and good loading linearity, 1 however, it is hard to load for servos with two-DF coupled motion.

SUMMARY

Considering the above issue, the present invention aims to provide a servo load platform suitable for two-DF coupled motion, for which an elastic loading rod is spherically hinged on a control surface fixture, and the upper end of the elastic loading rod is spherically hinged to a vertically sliding slider. When the control surface fixture rotates freely in pitch and yaw directions, the elastic loading rod can load the control surface fixture through its own bending deformation, thereby conducting a loading test on the servo with two-DF coupled motion. This is of great reference value for the research of servo load platforms with multi-channel coupled motion.

The technical solution adopted by the present invention is as follows:

A servo load platform suitable for two-DF coupled motion, which comprises a base for fixing a servo mounting seat, guide rods vertically set on the base, a slider for sliding on the guide rods, a spherical-hinge seat installed on the slider, an elastic loading rod connected to the movable end of the spherical-hinge seat, a connecting seat connected to the lower end of the elastic loading rod, and a control surface fixture that is set on the upper end of the servo mounting seat and detachably connected to the connecting seat.

Preferably, the slider comprises a connecting plate as well as linear bearings fixedly set on the connecting plate and sleeved on the guide rods.

Preferably, the spherical-hinge seat comprises a first mounting plate detachably connected to the connecting plate, a second mounting plate detachably connected to the first mounting plate, a ball movably set between the first and second mounting plates, and a mounting sleeve detachably connected to the ball for installing the elastic loading rod.

Preferably, a stopper is fixedly set on each guide rod.

Preferably, the control surface fixture, spherical-hinge seat and connecting seat are located on the same vertical line.

Preferably, a fixing ring is fixedly set on the base and movably sleeved on the servo mounting seat, and several screw stems are used on the fixing ring along the radial thread.

Preferably, the control surface fixture is detachably connected to the connecting seat through screws.

Preferably, the elastic loading rod is round.

Preferably, the elastic loading rod is made of composite glass fiber.

Preferably, at least two guide rods should be used.

In summary, thanks to the above technical solution, the beneficial effects of the present invention are:

1. The elastic loading rod is spherically hinged to the control surface fixture, and the upper end of the elastic loading rod is spherically hinged to a vertically sliding slider. When the control surface fixture rotates freely in pitch and yaw directions, the elastic loading rod can load the control surface fixture through its own bending deformation, thereby conducting a loading test on the servo with two-DF coupled motion. This is of great reference value for the research of servo load platforms with multi-channel coupled motion.

2. The article mentioned in this application is compact, reliable and is easy to assemble thanks to its simple and practical working principle. The servo load platform features high applicability and its indicator parameters can be flexibly designed according to requirements.

BRIEF DESCRIPTION OF DRAWINGS

In order to clearly describe the technical solution of the embodiments of the present invention, a brief introduction will be given below to the drawings required in the embodiments. It should be understood that the following drawings only illustrate certain embodiments of the present invention and should not be considered as a limitation. For those skilled in the art, all other relevant drawings can be obtained based on these drawings without making any creative labor.

Figure 1:
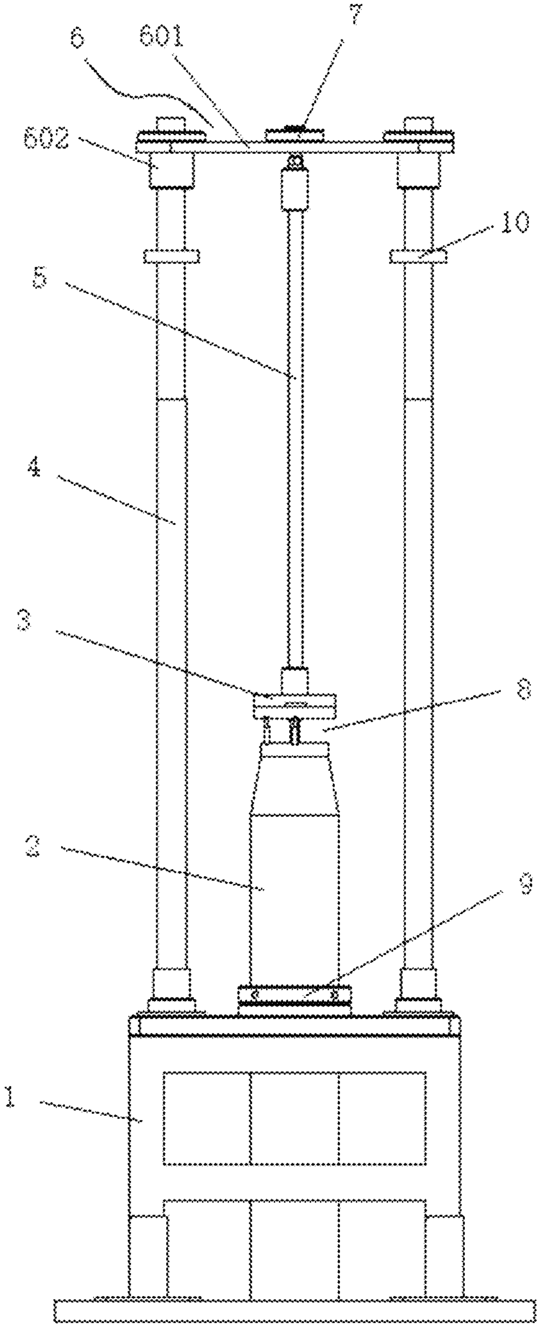
FIG. 1 shows an overall structure diagram for an embodiment of the present invention.

In the figures, 1—Base; 2—Servo Mounting Seat; 3—Connecting Seat; 4—Guide Rod; 5—Elastic Loading Rod; 6—Slider; 601—Connecting Plate; 602—Linear Bearing; 603—Mounting Hole; 7—Spherical-Hinge Seat; 701—First Mounting Plate; 702—Second Mounting Plate; 703—Ball; 704—Mounting Sleeve; 8—Control Surface Fixture; 801—Control Surface Platform; 802—First Extension Rod; 803—Second Extension Rod; 804 Support; 9—Fixing Ring; 10—Stopper.

DETAILED DESCRIPTION OF THE EMBODIMENTS

In order to illuminate the purpose, technical solution and advantages of the embodiments of the present invention, the following will provide a clear and complete description for the technical solution of the present invention in conjunction with the embodiment drawings. It is obvious that the described embodiments are only a part of those of the present invention. The components of the embodiments of the present invention described and illustrated in the drawings can be arranged and designed in various configurations.

Therefore, the detailed description of the embodiments of the present invention provided in the drawings is not intended to limit the claimed invention, but only to represent the selected embodiments of the present invention. For the embodiments of the present invention, all other embodiments obtained by those ordinary skilled in the art without creative labor are deemed as within the protection of the present invention.

In the description of the present invention, it should be understood that the terms "center", "up", "down", "left", "right", "vertical", "horizontal", "inside", "outside" and other directional or positional relationships indicated are based on those shown in the drawings, or the directional or positional relationships commonly adopted when using the applied product, they only aim to facilitate the invention description and simplify the corresponding description, rather than indicate or imply that a device or an element indicated must be constructed and operated in a specified direction, and therefore should not be deemed as a limitation to the present invention.

The following details the present invention with reference to FIGS. 1-8.

Embodiments

A servo load platform suitable for two-DF coupled motion, as shown in FIG. 1, it comprises a base 1 for fixing a servo mounting seat 2, guide rods 4 vertically set on the base 1, a slider 6 for sliding on the guide rods 4, a spherical-hinge seat 7 installed on the slider 6, an elastic loading rod 5 connected to the movable end of the spherical-hinge seat 7, a connecting seat 3 connected to the lower end of the elastic loading rod 5, and a control surface fixture 8 that is set on the upper end of the servo mounting seat 2 and detachably connected to the connecting seat 3.

Figure 2:
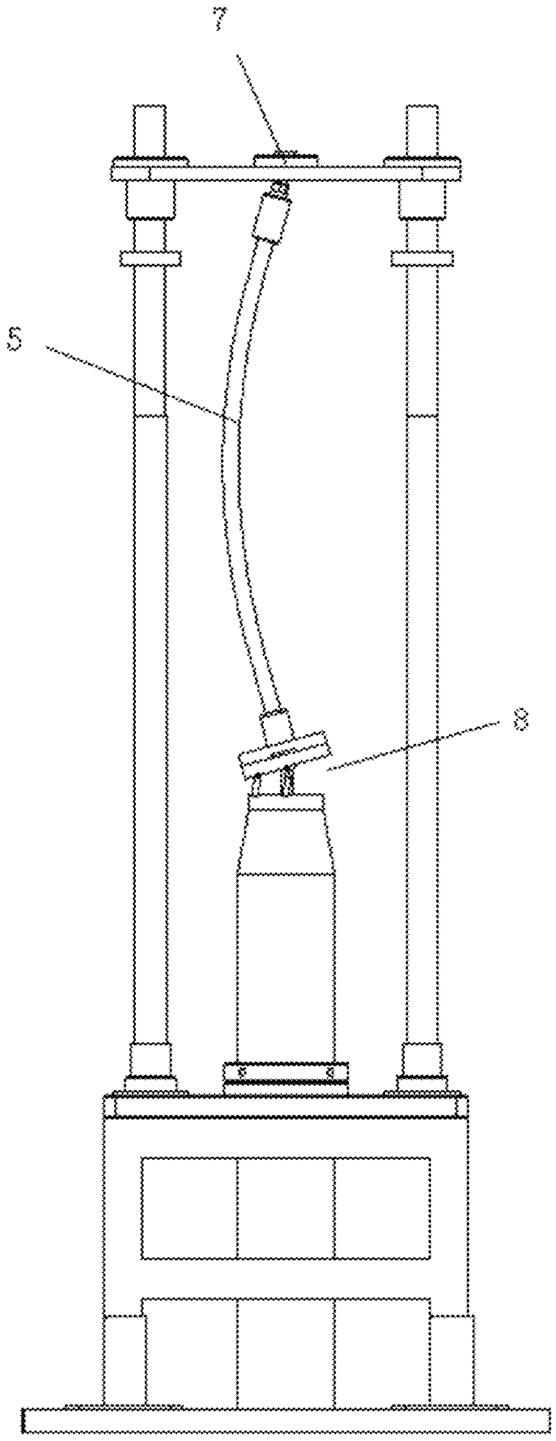
FIG. 2 shows a schematic application diagram for an embodiment of the present invention.

The servo mounting seat 2 and control surface fixture 8 form the servo, an elastic loading rod 5 is spherically hinged on the control surface fixture 8, and the upper end of the elastic loading rod 5 is spherically hinged to a vertically sliding slider through a spherical-hinge seat 7. When the control surface fixture 8 rotates freely in pitch and yaw, as shown in FIG. 2, the elastic loading rod 5 can load the control surface fixture 8 through its own bending deformation; During bending of the elastic loading rod 5, the slider 6 can slide up and down to adjust its position, ensuring the normal bending of the elastic loading rod 5.

Figure 6:
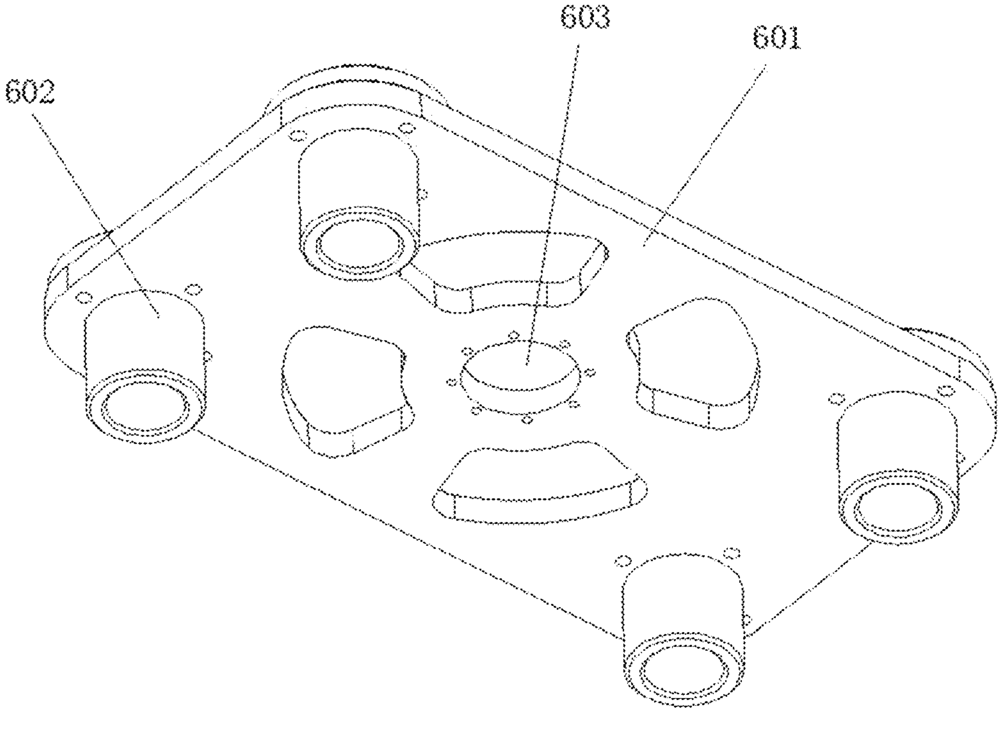
FIG. 6 shows a slider structure diagram provided in an embodiment of the present invention.

As shown in FIG. 6, the slider 6 comprises a connecting plate 601 as well as linear bearings 602 fixedly set on the connecting plate 601 and sleeved on the guide rods 4. The slider 6 can help to reduce the friction between the connecting plate 601 and guide rods 4 through linear bearings 602, ensuring that the connecting plate 601 can still move smoothly on the guide rods 4 when the slider 6 is subjected to a high acting force.

Figure 7:
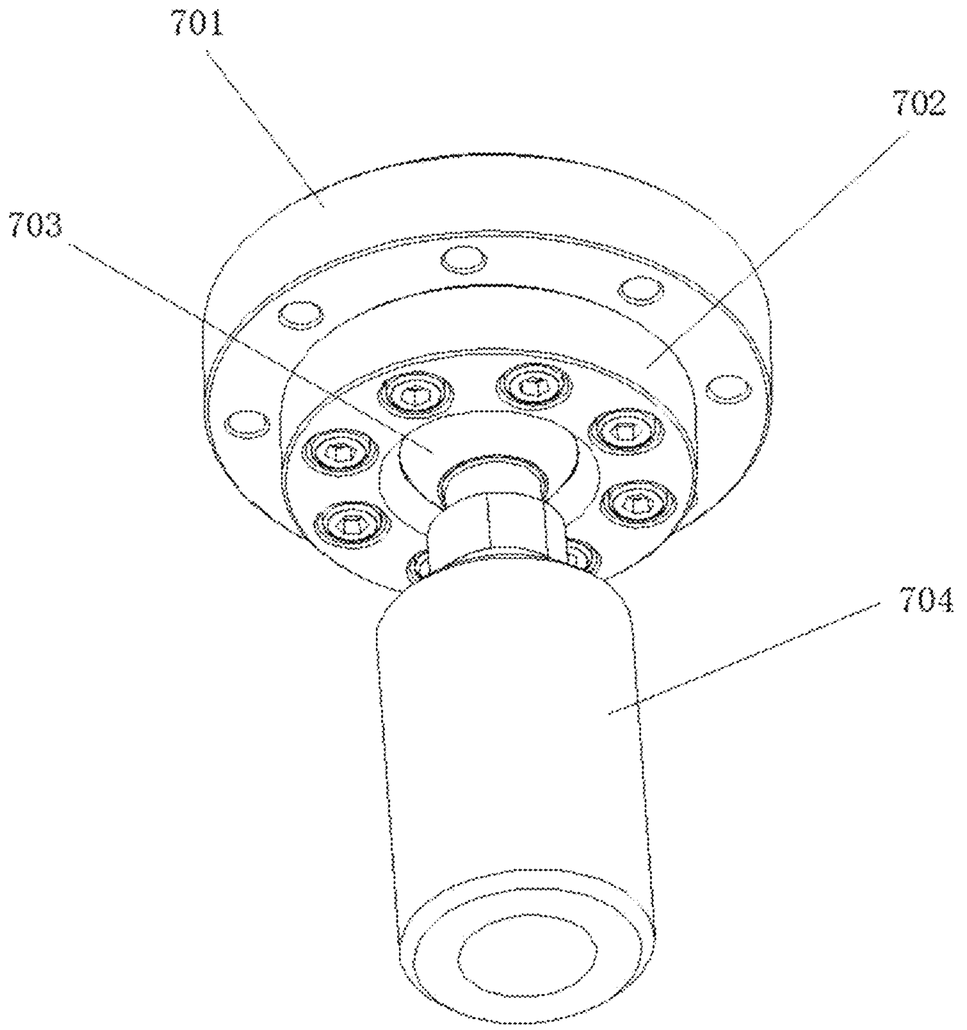
FIG. 7 shows a spherical-hinge seat structure diagram for an embodiment of the present invention.
Figure 8:
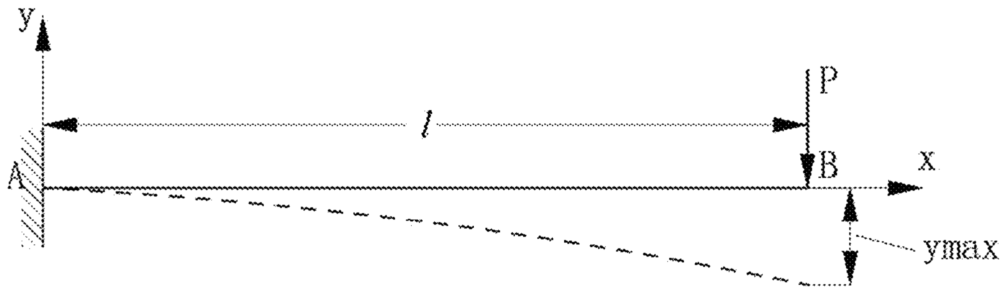
FIG. 8 shows an examination model diagram of an elastic loading rod for an embodiment of the present invention.

As shown in FIG. 7, the spherical-hinge seat 7 comprises a first mounting plate 701 detachably connected to the connecting plate 601, a second mounting plate 702 detachably connected to the first mounting plate 701, a ball 703 movably set between the first mounting plate 701 and second mounting plate 702, and a mounting sleeve 704 detachably connected to the ball 703 for installing the elastic loading rod 5. The surfaces of the first mounting plate 701 and second mounting plate 702 opposite to each other are concave for the ball's 703 movement; The connecting plate 601 is provided with a mounting hole 603 for the second mounting plate 702 to pass through.

Installation of the spherical-hinge seat 7: Place the ball 703 in the concave between the first mounting plate 701 and second mounting plate 702, use screws to connect the first mounting plate 701 and second mounting plate 702, and then connect the mounting sleeve 704; Place the entire spherical-hinge seat 7 from top to bottom into the mounting hole 603 of the connecting plate 601, and then use screws to connect the first mounting plate 701 with the connecting plate 601 to complete the installation.

Several screw stems (not shown in the figures) are connected on the mounting sleeve 704 along the radial thread. The elastic loading rod 5 can be locked by screw stems after being inserted into the mounting sleeve 704; If the selected elastic loading rod 5 is too big to be inserted into the mounting sleeve 704, the original mounting sleeve 704 can be removed and replaced with a bigger mounting sleeve 704. A connecting rod is radially connected to the ball 703, and the end of the connecting rod away from the ball 703 is threaded with the mounting sleeve 704, achieving a detachable connection between the ball 703 and mounting sleeve 704. The connecting rod is provided with fixed nut for clamping and fixing the connecting rod with a wrench or other tools, making it easy to remove the mounting sleeve 704.

A stopper 10 is fixedly set on each guide rod 4. The stopper 10 can help to stop downward sliding of linear bearings 602, making it convenient to place the slider 6 and suspend the elastic loading rod 5 during servo-free testing. The stop 10 positions do not affect normal sliding of the slider 6 during testing.

This application is applicable to load testing of any two-DF servos. In order to easily understand the proposed solution, this application is described through a servo with two extension rods controlling the pitch and yaw operations.

Figure 3:
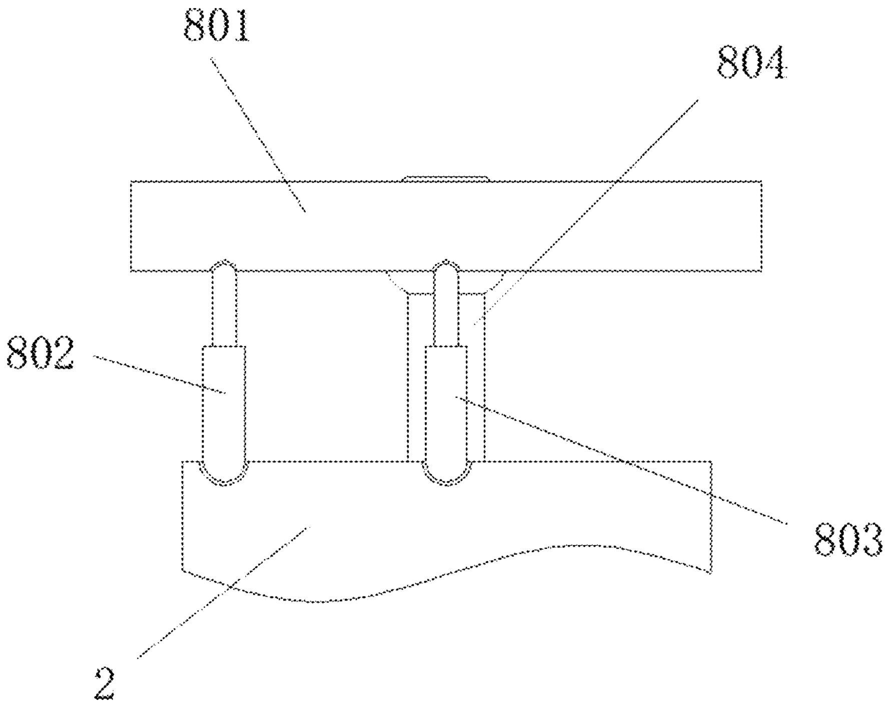
FIG. 3 shows a control surface fixture structure diagram for an embodiment of the present invention.

As shown in FIG. 3, the control surface fixture 8 comprises a control surface platform 801 connected to the connecting seat 3; the control surface platform 801 is spherically hinged to a support 804 fixed on the upper end of the servo mounting seat 2; the first extension rod 802 and second extension rod 803 are spherically hinged to the lower surface of the control surface platform 801; the ends of the first extension rod 802 and second extension rod 803 away from the control surface platform 801 are spherically hinged to the servo mounting seat 2. The running of the control surface platform 801 around the support 804 can be maintained by controlling the extension of the first extension rod 802 and second extension rod 803. The first extension rod 802 and second extension rod 803 can be electric extension rods, hydraulic extension rods, or pneumatic extension rods.

Before loading the control surface fixture 8, select an appropriate elastic loading rod 5 according to the requirements. Specifically, determine the diameter, length and material of the elastic loading rod 5 for a smooth examination of the elastic loading rod 5 to obtain key parameters required to calculate its actual torque. During testing, the control surface platform 801 deflects by a certain angle under the action of the first extension rod 802 and second extension rod 803, and the elastic loading rod 5 bends accordingly; the moment generated by bending can act on the control surface fixture, namely the load moment acting on the servo. The magnitude of the bending angle directly determines the load force acting on the servo. Control the reciprocating motion of the first extension rod 802 and second extension rod 803 under the conditions shown in FIG. 3 and the required deflection state. During deflection, the first extension rod 802 and second extension rod 803 will resist the force applied by the elastic loading rod 5, achieving a load testing. If the control surface platform 801 can deflect as required under the control of the servo, it indicates that the servo has passed the load testing.

Figure 4:
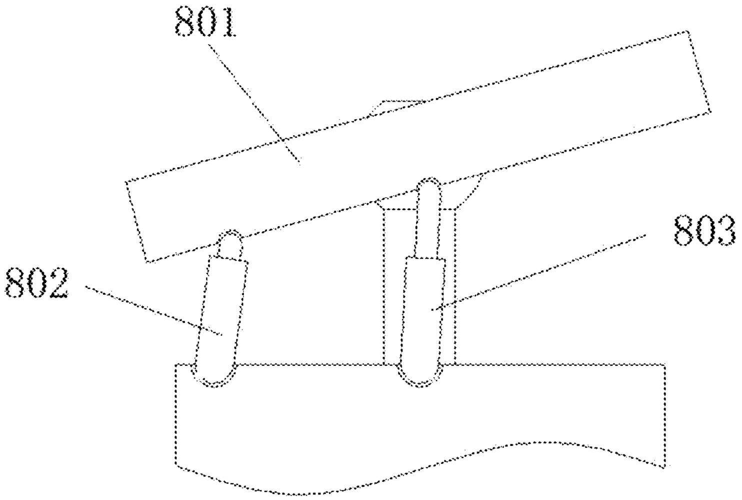
FIG. 4 shows a control surface fixture diagram in a pitch direction for an embodiment of the present invention.
Figure 5:
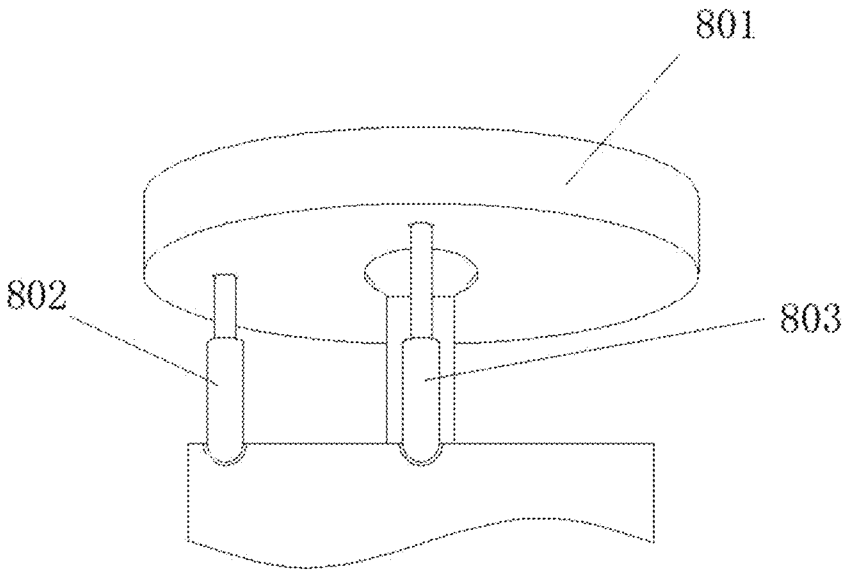
FIG. 5 shows a control surface fixture diagram in a yaw direction for an embodiment of the present invention.

FIGS. 4 and 5 show the pitch and yaw of the control surface fixture 8. The pitch and yaw rotation of the control surface platform 801 are controlled by the specific extension lengths of the first extension rod 802 and second extension rod 803. The limiting cases of the two types of yaw movements of the control surface platform 801 are: Deflection by 30° in the pitch direction and by 30° in the yaw direction.

The control surface fixture 8, spherical-hinge seat 7 and connecting seat 3 are located on the same vertical line. Specifically, the support 804, spherical-hinge seat 7, and connecting seat 3 are located on the same vertical line. As shown in FIGS. 1 and 3, when the control surface platform 801 is idle, the elastic loading rod 5 acts vertically on the support 804 to avoid affecting the balance of the control surface platform 801.

A fixing ring 9 is fixedly set on the base1 and movably sleeved on the servo mounting seat 9, and several screw stems are used on the fixing ring 9 along the radial thread. The servo mounting seat 2 is inserted into the fixing ring 9 and the servo mounting seat 2 is fixed by supporting screw stems, ensuring the stability of the servo mounting seat 2 during loading testing.

The control surface fixture 8 is detachably connected to the connecting seat 3 through screws, which facilitates the subsequent replacement of other size elastic loading rods 5 or other servo mounting seats 2.

The elastic loading rod 5 is round, which ensures that the bending of the elastic loading rod 5 in any direction is uniformly stressed.

The elastic loading rod 5 is made of composite glass fiber, which is a composite material with glass fiber as the reinforcing material and synthetic resin as the matrix material and can withstand tensile stress, bending, compression and shear stress to ensure repeated bending of the elastic loading rod 5; The elastic loading rod 5 is anti-fatigue and can restore without deformation under a stress.

At least two guide rods 4 should be used. In this application, 4 guide rods are used in order to ensure normal sliding of the slider 6 and stability of the spherical-hinge seat 7 when the elastic loading rod 5 bends.

In this embodiment, the indicator parameters of the servo load platform are: rated output torque: ≥230 N·m, deflection angle: ≤±15°, loading gradient: ≥≥13 N·m/°, bandwidth: ≤5 Hz.

In order to obtain a more accurate torque loading gradient and loading accuracy, it is necessary to examine the material of the elastic loading rod 5 to obtain the exact elastic modulus E. The examination method is as follows:

1. Establish a single mechanical model of a cantilever beam for examining the elastic loading rod 5 (made of composite glass fiber), as shown in the schematic diagram of FIG. 8. End A of the rod is fixed on the fixture, B is a free end. After applying a constant load P to End B according to a certain gradient, and recording Offset y of End B, the elastic modulus E of the material can be calculated according to the following formula.

2. Where, l is the distance between the fixed end and force application end of the elastic loading rod 5 (not the rod length), E is the elastic modulus of the material, l is the moment of inertia, P is the load, y is the calculated theoretical offset, and Δ is the measured actual offset. The parameter calculation formula under this model is shown below. Calculate the actual elastic modulus E of the material through y, and then calibrate the offset based on the actual elastic modulus.

$$y = \frac{Pl^3}{3EI}$$

Establish a physical model in a laboratory according to the above principle, with the Length L=700 mm, l=620 mm, Diameter d=20 mm. Load standard weights 23 kg, 28 kg, 34 kg and 39 kg to End B of the rod, and then measure the offset y values of End B, respectively.

3. The actual elastic modulus $E_1$ of a 20 mm diameter cylindrical rod calculated through a 23 kg standard weight is expressed as E1=32127 MPa;

$$P_1 = 23 \times 9.8 = 225.4N$$

$$d = 20 \text{ mm}$$

$$I = \frac{\pi d^4}{64} = \frac{3.14 \times 20 \times 20 \times 20 \times 20}{64} = 7850 \text{ mm}^4$$

$$\Delta_1 = 71 \text{ mm}$$

$$E_1 = \frac{P_1 l^3}{3\Delta_1 I} = \frac{225.4 \times 620 \times 620 \times 620}{3 \times 71 \times 7850} = 32127MPa$$

4. The measured and theoretical offset values obtained through a standard 28 kg weight are expressed as $\Delta_2$=87 mm and $y_2$=86.4 mm, respectively;

$$P_2 = 28 \times 9.8 = 274.4N$$

$$\Delta_2 = 87 \text{ mm}$$

$$y_2 = \frac{P_2 l^3}{3E_1 I} = \frac{274.4 \times 620 \times 620 \times 620}{3 \times 32127 \times 7850} = 86.4 \text{ mm}$$

5. The measured and theoretical offset values obtained through a standard 34 kg weight are expressed as $\Delta_3$=105 mm and $y_3$=104.9 mm, respectively;

$$P_3 = 34 \times 9.8 = 333.2N$$

$$\Delta_3 = 105 \text{ mm}$$

$$y_3 = \frac{P_3 l^3}{3E_1 I} = \frac{333.2 \times 620 \times 620 \times 620}{3 \times 32127 \times 7850} = 104.9 \text{ mm}$$

6. The measured and theoretical offset values obtained through a standard 39 kg weight are expressed as $\Delta_4$=121 mm and $y_4$=120.4 mm, respectively;

$$P_4 = 39 \times 9.8 = 382.2N$$

$$\Delta_4 = 121 \text{ mm}$$

$$y_4 = \frac{P_3 l^3}{3E_1 I} = \frac{382.2 \times 620 \times 620 \times 620}{3 \times 32127 \times 7850} = 120.4 \text{ mm}$$

7. The final elastic modulus of the elastic loading rod 5 with a diameter of 20 mm and a length of 700 mm is expressed as E=32127 MPa after using weights with different gradients.

8. According to the above mentioned, the final actual torque $M_A$ generated by the cylindrical rod when the control surface platform 801 deflects by $\theta_A$ (15°) is 252.6 N·m, and the torque loading gradient is 16.84 N·m/°.

$$M_A = \frac{3EI\theta_A}{l} = \frac{3 \times 32127 \times 7850 \times 15}{784 \times 57.3 \times 1000} \approx 252.6N \cdot m$$

Therefore, using the elastic loading rod 5 with a diameter of 20 mm and a length of 700 mm can meet the overall servo loading requirements. If an adjustment of the applied torque is required, just change the diameter d or length L of the elastic loading rod 5.

The above mentioned are only preferred embodiments of the present invention and do not mean a limitation to the present invention. For those skilled in the art, the present invention may have various modifications and variations. Any modifications, equivalent substitutions and improvements made within the spirit and principles of the present invention shall be covered in the protection of the present invention.

What is claimed is:

1. A servo load platform suitable for two degrees of freedom coupled motion, wherein the servo load platform comprises:

a base (1) for fixing a servo mounting seat (2), guide rods (4) vertically set on the base (1), a slider (6) for sliding on the guide rods (4), a spherical-hinge seat (7) installed on the slider (6), an elastic loading rod (5) connected to the movable end of the spherical-hinge seat (7), a connecting seat (3) connected to the lower end of the elastic loading rod (5), and a control surface fixture (8) that is set on the upper end of the servo mounting seat (2) and detachably connected to the connecting seat (3).

2. The servo load platform suitable for two-DF coupled motion according to claim 1, wherein the slider (6) comprises a connecting plate (601) and linear bearings (602), and wherein the linear bearings are fixedly set on the connecting plate (601) and sleeved on the guide rods (4).

3. The servo load platform suitable for two-DF coupled motion according to claim 2, wherein the spherical-hinge seat (7) comprises a first mounting plate (701) detachably connected to the connecting plate (601), a second mounting plate (702) detachably connected to the first mounting plate (701), a ball (703) movably set between the first mounting plate (701) and second mounting plate (702), and a mounting sleeve (704) detachably connected to the ball (703) for installing the elastic loading rod (5).

4. The servo load platform suitable for two-DF coupled motion according to claim 1, wherein a stopper (10) is fixedly set on each guide rod (4).

5. The servo load platform suitable for two-DF coupled motion according to claim 1, wherein the control surface fixture (8), spherical-hinge seat (7) and connecting seat (3) are located on the same vertical line.

6. The servo load platform suitable for two-DF coupled motion according to claim 1, wherein a fixing ring (9) is fixedly set on the base (1) and movably sleeved on the servo mounting seat (2), and several screw stems are used on the fixing ring (9) along the radial thread.

7. The servo load platform suitable for two-DF coupled motion according to claim 1, wherein the control surface fixture (8) is detachably connected to the connecting seat (3) through screws.

8. The servo load platform suitable for two-DF coupled motion according to claim 1, wherein the elastic loading rod (5) is round.

9. The servo load platform suitable for two-DF coupled motion according to claim 1, wherein the elastic loading rod (5) is made of composite glass fiber.

10. The servo load platform suitable for two-DF coupled motion according to claim 1, wherein at least two guide rods (4) should be used.

* * * * *